(12) United States Patent
Park

(10) Patent No.: US 9,576,396 B2
(45) Date of Patent: Feb. 21, 2017

(54) GRAPHICS PROCESSING UNIT, GRAPHICS PROCESSING SYSTEM INCLUDING THE SAME, AND METHOD OF OPERATING THE SAME

(71) Applicant: SAMSUNG ELECTRONICS CO., LTD., Suwon-si, Gyeonggi-do (KR)

(72) Inventor: Yong Ha Park, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 141 days.

(21) Appl. No.: 14/456,467

(22) Filed: Aug. 11, 2014

(65) Prior Publication Data

US 2015/0049107 A1 Feb. 19, 2015

(30) Foreign Application Priority Data

Aug. 13, 2013 (KR) .................... 10-2013-0096117

(51) Int. Cl.
  *G06T 17/20* (2006.01)
  *G06T 1/20* (2006.01)
  *G06T 15/00* (2011.01)

(52) U.S. Cl.
  CPC .......... *G06T 17/20* (2013.01); *G06T 1/20* (2013.01); *G06T 15/005* (2013.01); *G09G 2330/021* (2013.01)

(58) Field of Classification Search
  CPC .......... G06T 1/20; G06T 7/0079; G06T 7/407; G06T 15/04
  See application file for complete search history.

(56) References Cited

U.S. PATENT DOCUMENTS

| | | | |
|---|---|---|---|
| 6,313,846 B1 | 11/2001 | Fenney et al. |
| 6,906,715 B1 | 6/2005 | Dunn |
| 7,768,521 B2 | 8/2010 | Fuchie |
| 7,999,819 B2 | 8/2011 | Liao et al. |
| 8,189,007 B2 | 5/2012 | Kim |
| 8,203,564 B2 | 6/2012 | Jiao et al. |
| 2008/0211823 A1 | 9/2008 | Chung et al. |

FOREIGN PATENT DOCUMENTS

| | | |
|---|---|---|
| JP | 2002-366968 | 12/2002 |
| JP | 2006-120181 | 5/2006 |
| JP | 2008-282170 | 11/2008 |
| JP | 2011-044077 | 3/2011 |
| JP | 2012-164238 | 8/2012 |
| KR | 1020080064528 | 7/2008 |

*Primary Examiner* — Antonio A Caschera
(74) *Attorney, Agent, or Firm* — F. Chau & Associates, LLC

(57) ABSTRACT

A method of operating a graphics processing unit includes generating a first display list including a position information index, an attribute information index, and a texture patch descriptor index for each of a plurality of new primitives; generating a second display list by sorting the first display list according to texture patch descriptor indexes; and rendering the plurality of new primitives based on the second display list.

17 Claims, 15 Drawing Sheets

FIG. 9

| TP Descriptor 0 |
| TP Descriptor 1 |
| TP Descriptor 2 |

FIG. 10

| | | | | DL1' |
|---|---|---|---|---|
| Pointer Tile 0 | Pointer PP0 | Pointer PA0 | Pointer TP Descriptor 0 |
| | Pointer PP1 | Pointer PA1 | Pointer TP Descriptor 0 |
| | Pointer PP2 | Pointer PA2 | Pointer TP Descriptor 1 |
| | Pointer PP3 | Pointer PA3 | Pointer TP Descriptor 1 |
| Pointer Tile 1 | Pointer PP4 | Pointer PA4 | Pointer TP Descriptor 0 |
| | Pointer PP5 | Pointer PA5 | Pointer TP Descriptor 0 |
| | Pointer PP6 | Pointer PA6 | Pointer TP Descriptor 2 |
| 501 | 502 | 503 | 504 |

FIG. 11

| Position Attribute Map 0 |
| Position Attribute Map 1 |
| Position Attribute Map 2 |

GRAPHICS PROCESSING UNIT, GRAPHICS PROCESSING SYSTEM INCLUDING THE SAME, AND METHOD OF OPERATING THE SAME

CROSS-REFERENCE TO RELATED APPLICATIONS

This application claims priority under 35 U.S.C. §119(a) from Korean Patent Application No. 10-2013-0096117 filed on Aug. 13, 2013, which is hereby incorporated by reference in its entirety.

TECHNICAL FIELD

Embodiments of the inventive concept relate to a graphics processing unit (GPU), a graphics processing system including the same and a method of operating the same, and more particularly, to a GPU for reducing waste of a bandwidth and power consumption, a graphics processing system including the same, and a method of operating the same.

DISCUSSION OF THE RELATED ART

A GPU renders an image of an object to be displayed on a display. Recently, the GPU has been improved to perform a tessellation operation in the course of rendering the image of the object to display a finer image of the object. Tessellation refines base patches into many triangles in order to visualize smooth curves/surfaces, where a patch is a curve/surface defined by control points and a parametric equation. The GPU generates a plurality of primitives for the image of the object through the tessellation operation and stores data corresponding to the primitives in an external memory. The GPU needs to read and write a volume of data corresponding to the plurality of primitives in order to perform operations following the tessellation operation, which causes an increase of the bandwidth of the data and an increase of power consumption.

SUMMARY

Some exemplary embodiments of the present invention provide a graphics processing unit (GPU) that minimizes the increase or the waste of memory-access bandwidth and power consumption associated with a tessellation operation by performing rendering based on texture patches, a graphics processing system including the same, and a method of operating the same.

According to an aspect of the inventive concept, there is provided a method of operating a GPU. The method includes generating a first display list including a position information index, an attribute information index, and a texture patch descriptor index for each of a plurality of new primitives; generating a second display list by rearranging (e.g., sorting) the first display list data by (i.e., according to) texture patch descriptor indexes; and rendering the plurality of new primitives based on the second display list.

The generating the second display list may include generating a position-attribute map including the position information index and the attribute information index of each of new primitives corresponding to each texture patch descriptor index based on the first display list; and generating the second display list arranged (i.e., sorted according to) the texture patch descriptor indexes based on the position-attribute map.

The generating the second display list may further include removing an invisible (i.e., non-visible in the orientation to be displayed) primitive among the plurality of new primitives from the first display list based on the position information index of each of the plurality of new primitives.

The position-attribute map may be generated based on the first display list about some of the plurality of new primitives.

Alternatively, the position-attribute map may be generated based on the first display list about all of the plurality of new primitives.

The first display list may be arranged (i.e., sorted according to) tile indexes of tiles including a plurality of pixels.

The texture patch descriptor index points at textures necessary to render each of new primitives corresponding to the texture patch descriptor index.

A memory capacity for the necessary textures may be determined depending on a memory capacity of a texture cache.

According to an aspect of the inventive concept, there is provided a GPU including a geometry processor configured to generate a first display list including a position information index, an attribute information index, and a texture patch descriptor index for each of a plurality of new primitives; a texture patch processor configured to generate a second display list by rearranging the first display list by texture patch descriptor indexes; and a rendering processor configured to render the plurality of new primitives based on the second display list.

The texture patch processor may include a position-attribute map generator configured to generate a position-attribute map including the position information index and the attribute information index of each of new primitives corresponding to each texture patch descriptor index based on the first display list; and a display list generator configured to generate the second display list arranged by the texture patch descriptor indexes based on the position-attribute map.

According to an aspect of the inventive concept, there is provided a GPU including a geometry processor configured to generate a texture patch descriptor index pointing at textures necessary to render each of a plurality of new primitives, a texture patch processor configured to generate a second display list arranged by texture patch descriptor indexes, and a rendering processor configured to render the plurality of new primitives based on the second display list.

According to an aspect of the inventive concept, there is provided a graphics processing system including a memory configured to store pixel data and vertex data including position information and attribute information of each of a plurality of vertices and a GPU configured to generate the pixel data by processing the vertex data. The GPU includes a geometry processor configured to generate a plurality of new primitives based on the vertex data and to generate a first display list including a position information index, an attribute information index, and a texture patch descriptor index for each of the plurality of new primitives; a texture patch processor configured to generate a second display list by rearranging the first display list by texture patch descriptor indexes; and a rendering processor configured to generate the pixel data by rendering the plurality of new primitives based on the second display list.

The inventive concept will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The above and other features and advantages of the inventive concept will become more apparent by describing in detail exemplary embodiments thereof with reference to the attached drawings in which:

FIG. 9 is a diagram of texture patch descriptors stored in a texture patch descriptor buffer in the memory of FIG. 2;

FIG. 10 is a diagram of a first display list generated with respect to the two tiles shown in FIG. 8;

FIG. 11 is a diagram of position attribute maps stored in the position attribute map buffer in the memory of FIG. 2;

FIG. 12 is a diagram of a first position attribute map among the position attribute maps shown in FIG. 11;

FIG. 13 is a diagram of a second display list resulting from rearrangement of the first display list illustrated in FIG. 10;

DETAILED DESCRIPTION OF THE EXEMPLARY EMBODIMENTS

Figure 1:
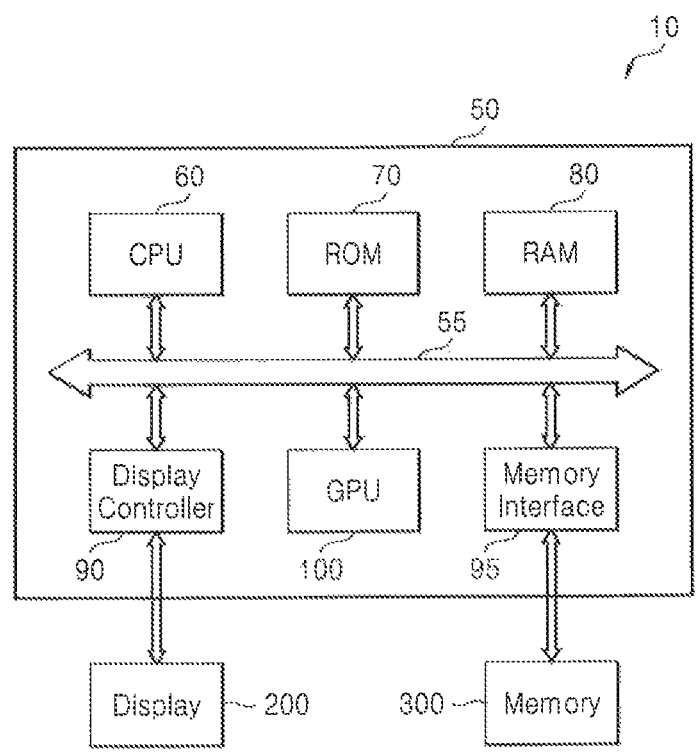
FIG. 1 is a block diagram of a data processing system according to an exemplary embodiment of the inventive concept.

FIG. 1 is a block diagram of a data processing system 10 according to an exemplary embodiment of the inventive concept. The data processing system 10 includes a data processing device 50, a display 200, and a memory 300.

The data processing system 10 may be implemented as a personal computer (PC), a portable electronic device (or mobile equipment), or an electronic device including the display 200 that can display an image based on digital image data. The portable electronic device may be a laptop computer, a cellular phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, or an e-book.

The data processing device 50 controls the display 200 and/or the memory 300. The data processing device 50 may control the overall operation of the data processing system 10. The data processing device 50 can be implemented with a printed circuit board (PCB) such as a motherboard, a motherboard/daughterboard combination, an integrated circuit (IC), or a system on chip (SoC). For instance, the data processing device 50 may be an application processor of a smart phone. The data processing device 50 includes a central processing unit (CPU) 60, a read-only memory (ROM) 70, a random access memory (RAM) 80, a display controller 90, a memory interface 95, and the GPU 100.

The CPU 60 controls the overall operation of the data processing device 50. For instance, the CPU 60 may control the operations of the elements 70, 80, 90, 95, and 100. The CPU 60 can communicate with the elements 70, 80, 90, 95, and 100 through a bus (system bus) 55. The CPU 60 can read and execute program instructions. For instance, programs and data stored in the memory 70, 80, and 300 can be loaded onto an internal memory, e.g., a cache memory (not shown), of the CPU 60 according to the control of the CPU 60.

The CPU 60 may be implemented as a multiple-core. The multi-core is a single computing component with two or more functionally independent cores that can operate in parallel.

The ROM 70 can permanently store programs and/or data. The ROM 70 may be implemented as erasable programmable ROM (EPROM) or electrically erasable programmable ROM (EEPROM).

The RAM 80 can temporarily store programs, data, or instructions. For instance, the programs and/or data stored in the memory 70 or 300 may be temporarily stored in the RAM 80 according to the control of the CPU 60, the control of the GPU 100, or a booting code stored in the ROM 70. The RAM 80 may be implemented as dynamic RAM (DRAM) or static RAM (SRAM).

The GPU 100 can be enabled to perform an operation related to graphics processing to reduce the load of the CPU 60.

The display controller 90 controls the operation of the display 200. For instance, the display controller 90 can transmit digital image data, e.g., still image data, moving image data, three-dimensional (3D) image data or stereoscopic 3D image data, from the memory 300 to the display 200.

The memory interface 95 functions as a memory controller that can access the memory 300. For instance, the data processing device 50 and the memory 300 may communicate with each other through the memory interface 95. The data processing device 50 and the memory 300 transmit data to and receive data from each other through the memory interface 95.

The display 200 can display a sequence of image frames corresponding to digital image data output from the display controller 90. The display 200 may be implemented as a touch screen, a liquid crystal display, a thin film transistor LCD (TFT-LCD), a light emitting diode (LED) display, an organic LED (OLED) display, an active matrix OLED (AMOLED) display, or a flexible display.

The memory 300 can store programs and/or data (or image data) to be processed by the CPU 60 and/or the GPU 100. The memory 300 may be implemented as a volatile or non-volatile memory device.

The volatile memory device can be implemented using DRAM, SRAM, thyristor RAM (T-RAM), zero capacitor RAM (Z-RAM), or twin transistor RAM (TTRAM). The non-volatile memory device of the memory 300 can be implemented using electrically erasable programmable ROM (EEPROM), flash memory, magnetic RAM (MRAM), spin-transfer torque MRAM (STT-MRAM), conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory. The non-volatile memory device can be implemented as a flash-based memory device such as a secure digital (SD) card, a multimedia card (MMC), an embedded MMC (eMMC), a universal serial bus (USB) flash drive, or a universal flash storage (UFS). The non-volatile memory may also be implemented as a hard disk drive (HDD) or a solid state drive (SSD).

Figure 2:
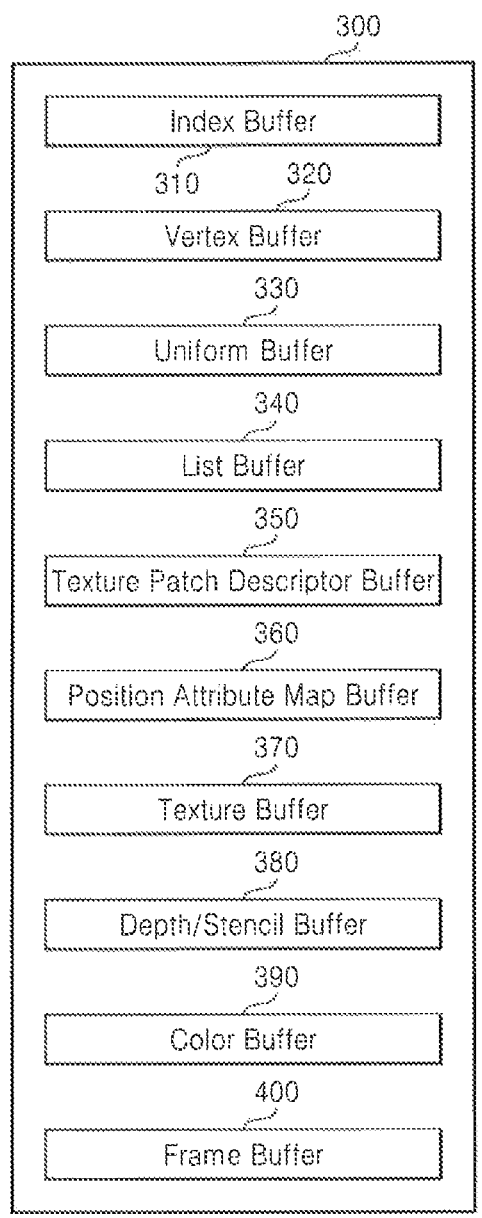
FIG. 2 is a schematic block diagram of the memory in the data processing system of FIG. 1.

FIG. 2 is a schematic block diagram of the memory 300 in the data processing system of FIG. 1. Referring to FIGS. 1 and 2, the memory 300 includes an index buffer 310, a vertex buffer 320, a uniform buffer 330, a list buffer 340, a texture patch descriptor buffer 350, a position attribute map buffer 360, a texture buffer 370, a depth/stencil buffer 380, a color buffer 390, and a frame buffer 400.

The index buffer 310 stores an index of data stored in each of the buffers 320 through 400. For instance, the index may include attribute information such as the name and size of the data and position information about the position, e.g., the buffer 320, 330, 340, 30, 370, 380, or 390, where the data is stored.

The vertex buffer 320 stores vertex data including position information of a vertex and attribute information about color, normal vector and texture coordinates of the vertex. The vertex buffer 320 may also store primitive data including position information of new primitives (e.g., a vertex, a line, and a polygon) generated by a geometry shader (120 in FIG. 4) and attribute information about color, normal vector and texture coordinates of the new primitives. The vertex buffer 320 may also store patch data (or control point data) including position information of each of control points included in a patch necessary for the tessellation operation of the GPU 100 and attribute information such as a normal vector of each control point. For instance, the patch may be defined by the control points and a parameter equation.

The uniform buffer 330 stores a constant of a parametric equation defining a patch, e.g., a curve or a surface, and/or a constant of a shading program.

Figure 3:
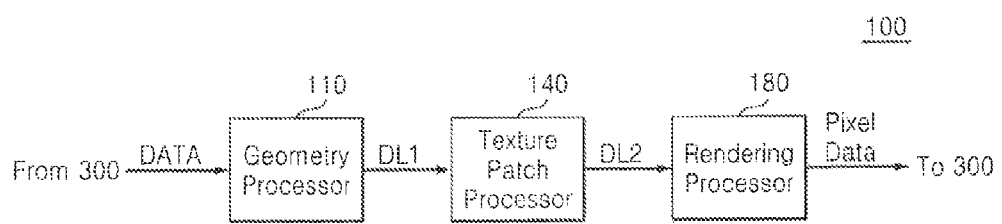
FIG. 3 is a block diagram of the graphics processing unit (GPU) in the data processing system of FIG. 1.

The list buffer 340 stores a first display list (DL1 in FIG. 3) and a second display list (DL2 in FIG. 3). In the first display list DL1, a tile generated by the tiling operation of the GPU 100 is matched with indexes of data (e.g., position information, attribute information and texture patch descriptor corresponding to new primitives). In other words, the first display list DL1 includes a position information index, attribute information index and texture patch descriptor for each of the new primitives generated by the geometry shader 120; and the position information index, attribute information index and texture patch descriptor of each new primitive are arranged by (i.e., sorted according to) tiles in the first display list DL1. The second display list DL2 is obtained by rearranging (e.g., sorting) the first display list DL1 data by (i.e., according to) texture patch descriptor indexes of the new primitives. The configuration of each of the first and second display lists DL1 and DL2 will be described with reference to FIGS. 8 through 13 later.

The texture patch descriptor buffer 350 stores a texture patch descriptor, i.e., position information about the position at which a texel (i.e., texture element) corresponding to a texture patch generated by the operation of a texture patch descriptor generator (124 in FIG. 4) is stored in the texture buffer 370. The texture patch descriptor includes a start address corresponding to the position information, size information, the number of lines, and offset information. Accordingly, a texture patch descriptor index points at textures necessary to render each new primitive corresponding to the texture patch descriptor index.

The position-attribute map buffer 360 stores a position-attribute map including a position information index and an attribute information index for the new primitive corresponding to the texture patch descriptor based on the first display list DL1. The configuration of the position-attribute map will be described with reference to FIGS. 8 through 13 later.

In various alternative embodiments, the position-attribute map buffer 360 can be implemented in the GPU 100 instead of the memory 300. This will be described in detail with reference to FIG. 6 later.

The texture buffer 370 stores a plurality of texels, i.e., textures necessary to render the new primitives, in the form of tiles. The depth/stencil buffer 380 stores depth data about the depth of each of pixels included in an image processed, e.g., rendered, by the GPU 100 and stencil data about the stencil of each pixel.

The color buffer 390 stores color data about color for a blending operation performed in the GPU 100. The frame buffer 400 may store pixel data (or image data) of a pixel finally processed by the GPU 100.

FIG. 3 is a block diagram of the GPU 100 in the data processing system of FIG. 1. Referring to FIGS. 1 through 3, the GPU 100 may include a geometry processor 110, a texture patch processor 140, and a rendering processor 180.

The geometry processor 110 is configured to receive input data DATA, generate a plurality of new primitives, and to generate position information, attribute information, and a texture patch descriptor for each of the new primitives. The geometry processor 110 can generate the first display list DL1 including a position information index indicating a position at which the position information is stored in the memory 300, an attribute information index indicating a position at which the attribute information is stored in the memory 300, and a texture patch descriptor index indicating a position at which the texture patch descriptor is stored in the memory 300.

The texture patch processor 140 can generate the second display list DL2 by rearranging the first display list DL1 by texture patch descriptor indexes. The rendering processor 180 can generate pixel data by rendering the new primitives based on the second display list DL2.

The elements 110, 140, and 180 of the GPU 100 execute a graphics processing-related program instruction (or a shading program) SHP output from the RAM 80 according to the control of a control logic (not shown). For instance, the program instruction SHP may include a vertex shader program instruction, a tiler program instruction, a hull shader program instruction, a tessellator program instruction, a domain shader program instruction, a geometry shader program instruction, a rasterizer program instruction, a pixel shader program instruction, and an output merger program instruction. The operations of the elements 110, 140, and 180 will be described in detail with reference to FIGS. 4 through 13.

Figure 4:
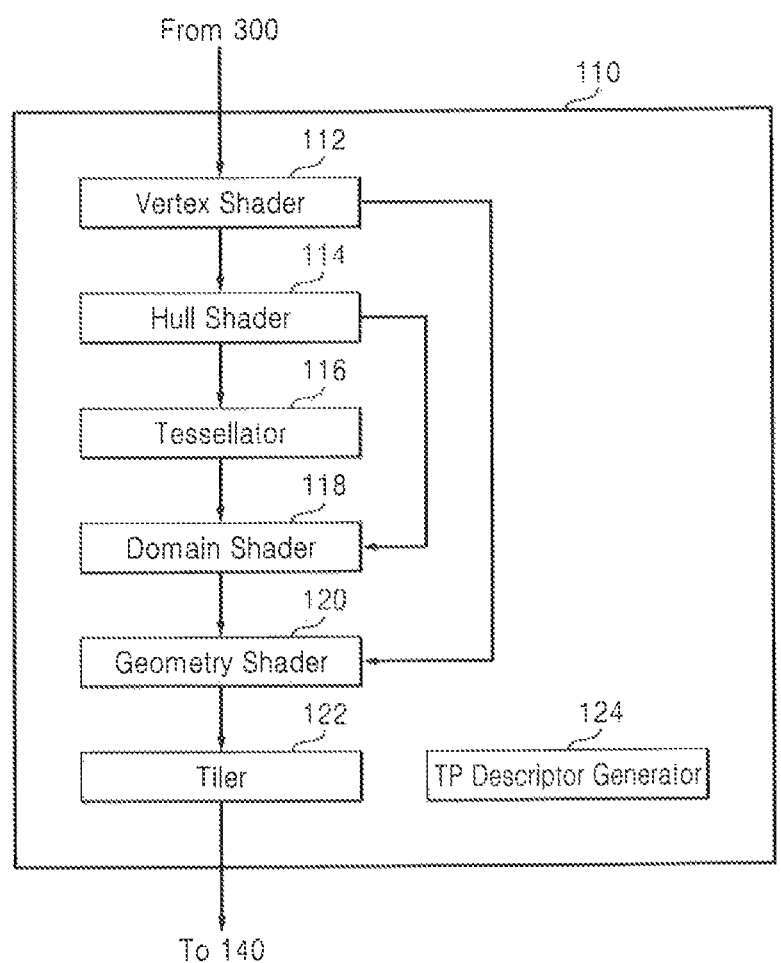
FIG. 4 is a detailed block diagram of the geometry processor in the GPU of FIG. 3.

FIG. 4 is a detailed block diagram of the geometry processor 110 in the GPU of FIG. 3. Referring to FIGS. 1 through 4, the geometry processor 110 includes a vertex shader 112, a hull shader 114, a tessellator 116, a domain shader 118, a geometry shader 120, a tiler 122, and a texture patch descriptor generator 124.

The vertex shader 112 receives vertex data or patch data as the input data DATA from the vertex buffer 320. The vertex shader 112 processes the input data DATA. For instance, the vertex shader 112 may process the input data DATA using an operation such as transformation, morphing, skinning, or lighting.

The vertex shader 112 outputs processed data to the hull shader 114 or the geometry shader 120. For instance, when the input data DATA is the vertex data, the vertex shader 112 may process the vertex data and output the processed vertex data to the geometry shader 120. When the input data DATA is the patch data, the vertex shader 112 can process the patch data and output the processed patch data to the hull shader 114.

The hull shader 114 receives the processed patch data output from the vertex shader 112 and can determine a tessellation factor for the patch corresponding to the received data. For instance, the tessellation factor may be the level of detail (LOD) of the patch corresponding to the received data.

The hull shader 114 output the tessellation factor to the tessellator 116. The hull shader 114 may also output control points included in the received data, a parametric equation, and the tessellation factor to the domain shader 118.

The tessellator 116 tessellates tessellation domain coordinates based on the tessellation factor determined by the hull shader 114. For instance, the tessellation domain coordinates may be defined as (u, v) or (u, v, w). The tessellator 116 outputs the tessellated domain coordinates to the domain shader 118.

The domain shader 118 calculates spatial coordinates of the patch corresponding to the tessellated domain coordinates based on the tessellation factor and the parametric equation. For instance, the spatial coordinates may be defined as (x, y, z). The domain shader 118 may generate primitives such as dots, lines, and triangles using the calculated spatial coordinates and outputs the primitives to the geometry shader 120.

Primitive data about the primitives generated through a series of operations, i.e., the tessellation operation performed by the hull shader 114, the tessellator 116, and the domain shader 118 may be stored in the vertex buffer 320.

The geometry shader 120 generates new primitives by adding or removing vertices adjacent to the primitives output from the domain shader 118. In addition, the geometry shader 120 may generate new primitives by adding or removing vertices adjacent to the vertex output from the vertex shader 112. The geometry shader 120 outputs the new primitives to the tiler 122.

The tiler 122 tiles the new primitives received from the geometry shader 120. For instance, the tiler 122 may project the new primitives onto a virtual space corresponding to the display 200, perform tile binning in the virtual space based on a bounding box assigned to each of the new primitives, and compose a list, i.e., the first display list DL1 by matching each of tiles with indexes of the position information, the attribute information, and the texture patch descriptor, respectively, of each of new primitives included in each tile. The tiler 122 stores the first display list DL1 in the list buffer 340 and outputs the first display list DL1 to the texture patch processor 140.

The texture patch descriptor generator 124 generates a texture patch corresponding to each of the new primitives and may generate a texture patch descriptor, i.e., position information about a position at which a texel (or a texture element) included in the texture patch is stored in the texture buffer 370. The texture patch is a set of texels (or textures) necessary to render a vertex included in each of the new primitives, i.e., texels including a texture footprint defined by a texturing program in the pixel shader program instruction. The memory capacity corresponding to the texels (or textures) included in the texture patch may be determined depending on the memory capacity of a texture cache (184 in FIG. 7). For instance, the memory capacity corresponding to the texels (or the texture) may be set lower than the memory capacity of the texture cache 184.

The texture patch descriptor includes a start address, i.e., position information about a position at which each of the textures (or texels) included in the texture patch is stored in the texture buffer 370, size information, the number of lines, and offset information. Accordingly, the texture patch descriptor generator 124 provides a texture patch descriptor corresponding to each of the new primitives needed when the tiler 122 composes the first display list DL1.

Figure 5:
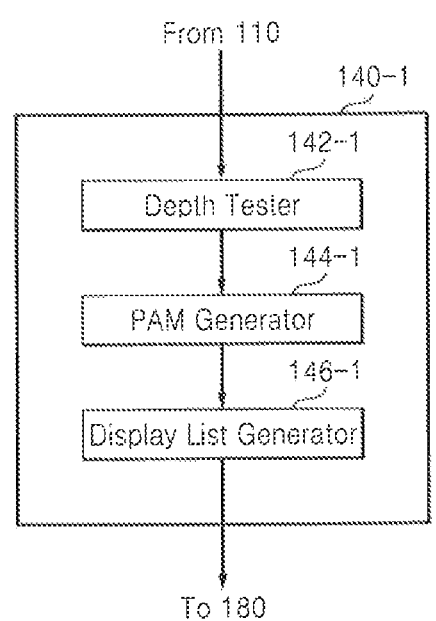
FIG. 5 is a block diagram of an exemplary implementation of the texture patch processor in the GPU of FIG. 3.
Figure 6:
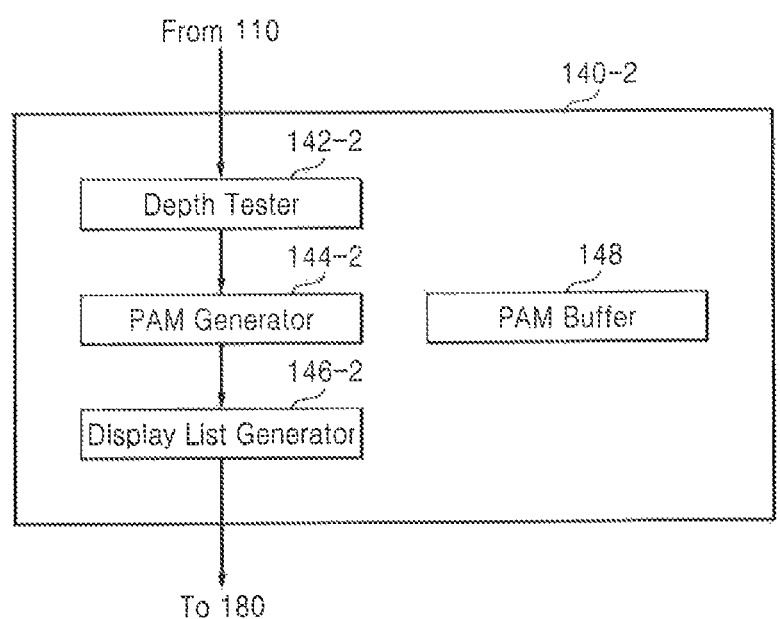
FIG. 6 is a block diagram of an exemplary implementation of the texture patch processor in the GPU of FIG. 3.

FIG. 5 is a block diagram of an exemplary implementation 140-1 of the texture patch processor 140 shown in the graphics processing unit (GPU) of FIG. 3. FIG. 6 is a block diagram of another exemplary implementation 140-2 of the texture patch processor 140 shown in the graphics processing unit (GPU) of FIG. 3. Referring to FIGS. 1 through 5, the texture patch processor 140-1 includes a depth tester 142-1, a position-attribute map (PAM) generator 144-1, and a display list generator 146-1.

The depth tester 142-1 can remove invisible primitives from a plurality of new primitives based on the position information index of each of the new primitives included in the first display list DL1. In other words, the depth tester 142-1 may make comparison on the position information of the new primitives stored in the vertex buffer 320 using the position information index of each of the new primitives and may cull only invisible primitives from the new primitives. For this operation, the depth tester 142-1 may include a test buffer (not shown) that stores the position information. For instance, when as a result of comparing the position information of the first primitive with that of the second primitive, if a two-dimensional coordinate range (e.g., x- and y-coordinates) of the second primitive is included in the two-dimensional coordinate range of the first primitive and if the depth coordinate (e.g., a z-coordinate) of the first primitive is less than that of the second primitive, then the depth tester 142-1 may determine that the first primitive is visible and the second primitive is invisible and then removes the second primitive.

According to embodiments, the depth tester 142-1 may perform the above-described operation on each vertex so that only a portion of a primitive may be culled as an invisible primitive.

The PAM generator 144-1 generates a position-attribute map including a position information index and an attribute information index of each of the new primitives corresponding to a texture patch descriptor based on the first display list DL1 from which the invisible primitives have been removed. In other words, the position-attribute map may be a map in which the position information index of each of new primitives corresponding to a texture patch descriptor is matched with the attribute information index of each of the new primitives with respect to the texture patch descriptor. The position-attribute map is generated for each texture patch descriptor, so that texture patch descriptors and position-attribute maps may be matched with each other one-to-one.

The PAM generator 144-1 generates a position-attribute map for each texture patch descriptor with respect to all new primitives included in the first display list DL1 and stores the position-attribute map in the position-attribute map buffer 360.

The display list generator 146-1 generates the second display list DL2 arranged by (i.e., sorted according to) texture patch descriptors based on the position-attribute map. In the second display list DL2, a texture patch descriptor is matched with an index of data (e.g., a position-attribute map and tile information and attribute information corresponding to new primitives) corresponding to the texture patch descriptor.

FIG. 6 is a block diagram of an exemplary implementation 140-2 of the texture patch processor 140 shown in the graphics processing unit (GPU) of FIG. 3 Referring to FIG. 6, the texture patch processor 140-2 includes a depth tester 142-2, a PAM generator 144-2, a display list generator 146-2, and a PAM buffer 148. The PAM generator 144-2 generates a position-attribute map for each texture patch descriptor with respect to some of the new primitives included in the first display list DL1 and stores the position-attribute map in the PAM buffer 148. In other words, unlike the PAM generator 144-1, the PAM generator 144-2 illustrated in FIG. 6 stores the position-attribute map in the PAM buffer 148 inside, not outside the GPU 100.

The PAM buffer 148 may be implemented using relatively fast volatile memory, e.g., SRAM. However, the PAM buffer 148 may be implemented using volatile memory having a small memory capacity for low power consumption and high degree of integration and it may store a position-attribute map for just some of the new primitives included in the first display list DL1.

Apart from the above-described differences, the structure and operations of the texture patch processor 140-2 illustrated in FIG. 6 are substantially the same as those of the texture patch processor 140-1 illustrated in FIG. 5.

Figure 7:
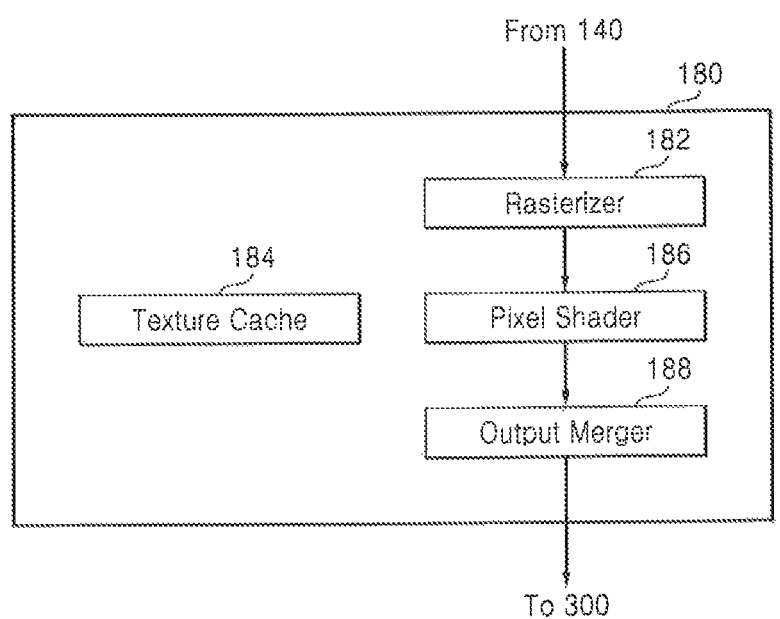
FIG. 7 is a block diagram of an exemplary implementation of the rendering processor in the GPU of FIG. 3.

FIG. 7 is a block diagram of an exemplary implementation of the rendering processor 180 illustrated in the graphics processing unit (GPU) of FIG. 3. Referring to FIGS. 1 through 7, the rendering processor 180 includes a rasterizer 182, a texture cache 184, a pixel shader 186, and an output merger 188.

The rasterizer 182 converts new primitives into pixels based on the second display list DL2 output from the texture patch processor 140.

The texture cache 184 temporarily stores a plurality of texels (or textures) necessary for the texture mapping operation of the pixel shader 186. The texture cache 184 can read and store necessary data corresponding to a plurality of texels (or textures) mapped to a texture patch descriptor, i.e., necessary data corresponding to a texture patch from the texture buffer 370. Accordingly, after reading and storing data corresponding to a first texture patch descriptor from the texture buffer 370, the texture cache 184 does not need to read data corresponding to a second texture patch descriptor until texture mapping is completed with respect to a plurality of pixels corresponding to the first texture patch descriptor. Therefore, the data bandwidth required for the texture mapping is reduced, so that data transmission efficiency is increased, and power consumption of the GPU 100 is also reduced.

The pixel shader 186 can process the effect(s) of the pixels. For instance, the effect(s) may be the color or the light and shade of the pixels.

According to exemplary embodiments, the pixel shader 186 can perform computation operations to process the effect(s) of the pixels. The computation operations may include texture mapping by the texturing program and color format conversion.

The texture mapping may be an operation of mapping a plurality of texels output from the texture cache 184 to add details to a plurality of pixels. The texture mapping is performed sequentially on the pixels converted based on the second display list DL2 and may thus be performed on each texture patch. The color format conversion may be an operation of converting the pixels into an RGB format, a YUV format, or a YCoCg format.

The output merger 188 confirms final pixels to be displayed on the display 200 among the processed pixels using information about previous pixels and generates color for the final pixels. For instance, the information about the previous pixels may include depth information, stencil information, and color information.

For instance, the output merger 188 may perform a depth test on the processed pixels based on the depth information received from the depth/stencil buffer 380 and may confirm the final pixels according this test result. The output merger 188 may also perform a stencil test on the processed pixels based on the stencil information received from the depth/stencil buffer 380 and may confirm the final pixels according that test result. In addition, the output merger 188 may blend the final pixels using color data received from the color buffer 390. The output merger 188 outputs pixel data (or image data) about the final pixels to the frame buffer 400.

The pixel data may be stored in the frame buffer 400 and can be displayed on the display 200 through the display controller 90.

According to some embodiments of the inventive concept, a GPU uses a display list arranged by (i.e., sorted according to) texture patches when performing rendering, thereby increasing data transmission efficiency and power efficiency.

Figure 8:
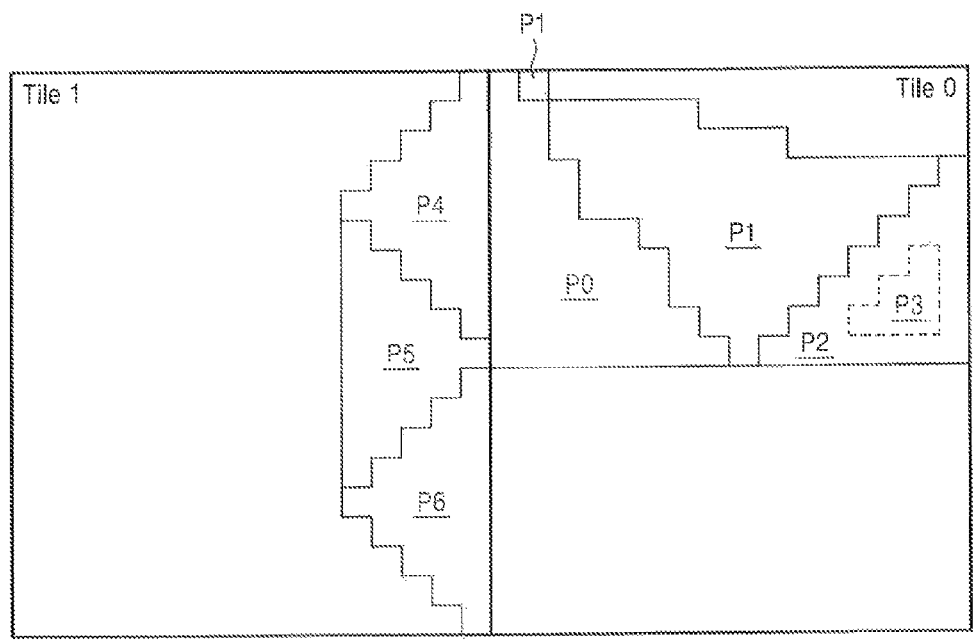
FIG. 8 is a diagram of two tiles illustrating a plurality of new primitives generated by the geometry processor in the GPU of FIG. 3.
Figure 12:
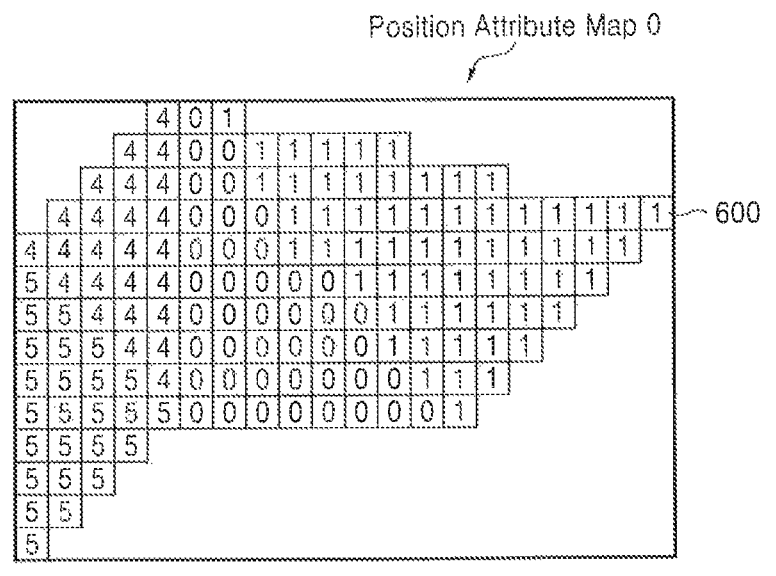
Figure 13:
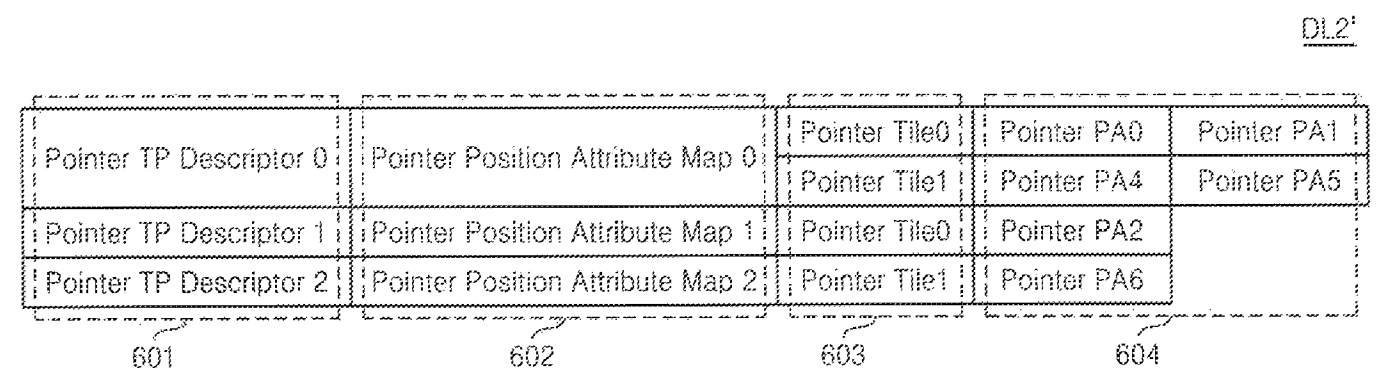

FIG. 8 is a diagram of two tiles illustrating a plurality of new primitives generated by the geometry processor 110 in the graphics processing unit (GPU) of FIG. 3. FIG. 9 is a diagram of texture patch descriptors stored in the texture patch descriptor buffer 350 in the memory 300 of FIG. 2. FIG. 10 is a diagram of a first display list generated with respect to the two tiles shown in FIG. 8. FIG. 11 is a diagram of position-attribute maps stored in the position attribute map buffer 360 in the memory 300 of FIG. 2. FIG. 12 is a diagram of a first position attribute map among the position attribute maps shown in FIG. 11. FIG. 13 is a diagram of a second display list resulting from rearrangement of the first display list illustrated in FIG. 10.

Referring to FIGS. 1 through 13, FIG. 8 shows first through seventh primitives P0, P1, P2, P3, P4, P5, and P6 included in a first tile Tile0 and a second tile Tile1 among a plurality of new primitives generated by the geometry shader 120 of the geometry processor 110. The first tile Tile0 includes the first through fourth primitives P0 through P3 and the second tile Tile1 includes the fifth through seventh primitives P4 through P6. Here, the two-dimensional coordinate range of the fourth primitive P3 is included within the two-dimensional coordinate range of the third primitive P2 and the depth coordinate of the fourth primitive P3 is greater than that of the third primitive P2. Accordingly, the depth tester 142-1 or 142-2 may determine that the third primitive P2 is visible and that the fourth primitive P3 is invisible and thus may remove indexes corresponding to the fourth (invisible) primitive P3.

FIG. 9 shows texture patch descriptors TP Descriptor0, TP Descriptor1 and TP Descriptor2 stored in the texture patch descriptor buffer 350 in the memory 300 of FIG. 2.

FIG. 10 shows a first display list DL1' generated by the tiler 122 with respect to the first and second tiles Tile0 and Tile1 illustrated in FIG. 8. The first display list DL1' includes a tile index section 501, a position information index section 502, an attribute information index section 503, and a texture patch descriptor index section 504.

In the first display list DL1', tile indexes Pointer Tile0 and Pointer Tile1 are matched with position information indexes among Pointer PP0 through Pointer PP6, attribute information indexes among Pointer PA0 through Pointer PA6, and texture patch descriptor indexes among Pointer TP Descriptor0 through Pointer TP Descriptor2, which respectively correspond to the new primitives P0 through P6 included across the tiles Tile0 and Tile1 respectively corresponding to the tile indexes Pointer Tile0 and Pointer Tile1.

The first display list DL1' is arranged by (i.e., sorted according to) tiles. For instance, for the third primitive P2 included in the first tile Tile0, the first tile index Pointer Tile0, the third position information index Pointer PP2, the third attribute information index Pointer PA2, and the second texture patch descriptor index Pointer TP Descriptor1 are stored to correspond to each other (i.e., matched with one another) in the first display list DL1.

FIG. 11 shows position-attribute maps Position Attribute Map0, Position Attribute Map1, and Position Attribute Map2 stored in the position-attribute map buffer 360. FIG. 12 shows the first position-attribute map Position Attribute Map0 among the position-attribute maps Position Attribute Map0 through Position Attribute Map2 shown in FIG. 11.

The first position-attribute map Position Attribute Map0 includes the position information indexes Pointer PP0, Pointer PP1, Pointer PP4, and Pointer PP5 and the corresponding attribute information indexes Pointer PA0, Pointer PA1, Pointer PA4, and Pointer PA5 for the new primitives P0, P1, P4, and P5 matched with the first texture patch descriptor index Pointer TP Descriptor0 among the new primitives P0 through P6. Space marked in the first position-attribute map Position Attribute Map0 corresponds to space marked across the first and second tiles Tile0 and Tile1. The first position-attribute map Position Attribute Map0 also includes information about matching each pixel 600 corresponding to each one of the new primitives P0, P1, P4, and P5 with one of the position information indexes Pointer PP0, Pointer PP1, Pointer PP4, and Pointer PP5 and one of the attribute information indexes Pointer PA0, Pointer PA1, Pointer PA4, and Pointer PA5.

The position-attribute maps Position Attribute Map0 through Position Attribute Map2 do not include information about the invisible primitives, e.g., the fourth primitive P3 removed by the depth tester 142-1 or 142-2, as described above with reference to FIG. 8.

FIG. 13 shows a second display list DL2' resulting from the rearrangement of the first display list DL1' shown in FIG. 10. The second display list DL2' includes a texture patch descriptor index section 601, a position-attribute map index section 602, a tile index section 603, and an attribute information index section 604.

In the second display list DL2', the texture patch descriptor indexes Pointer TP Descriptor0 through Pointer TP Descriptor2 are matched with the tile indexes Pointer Tile0 and Pointer Tile1 and with the attribute information indexes Pointer PA0 through Pointer PA2 and Pointer PA4 through Pointer PA6. The attribute information indexes Pointer PA0 through Pointer PA2 and Pointer PA4 through Pointer PA6 correspond to the new primitives P0 through P2 and P4 through P6 included across the position-attribute maps Position Attribute Map0 through Position Attribute Map2 respectively matched with the texture patch descriptor indexes Pointer TP Descriptor0 through Pointer TP Descriptor2. Thus, the second display list DL2' is arranged by (i.e., sorted according to) texture patch descriptors.

For instance, the first texture patch descriptor index Pointer TP Descriptor0 is matched with the attribute information indexes Pointer PA0, Pointer PA1, Pointer PA4, and Pointer PA5, which respectively correspond to the new primitives P0, P1, P4, and P5 included in the first position-attribute map Position Attribute Map0, by tiles.

Figure 14:
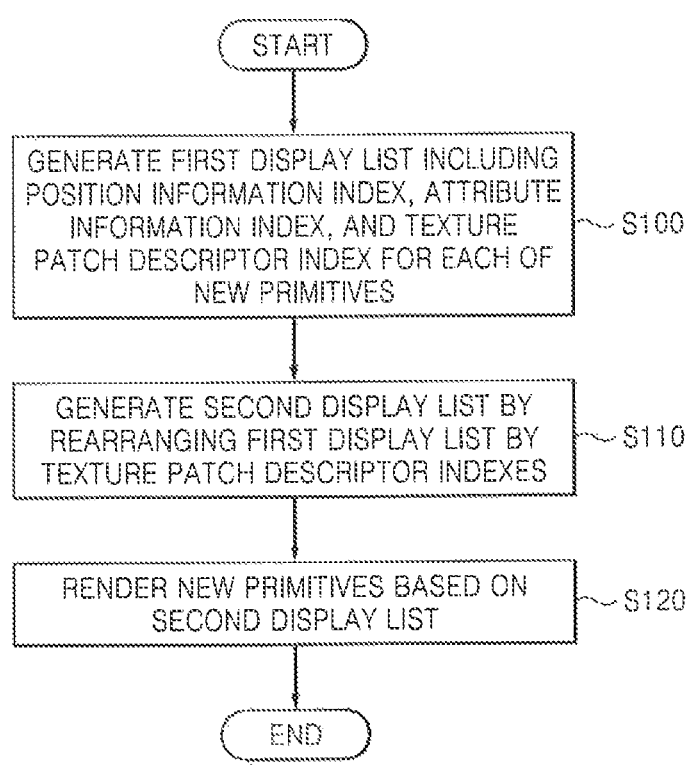
FIG. 14 is a flowchart of a method of operating the GPU of FIG. 3 according to an exemplary embodiment of the inventive concept.
Figure 15:
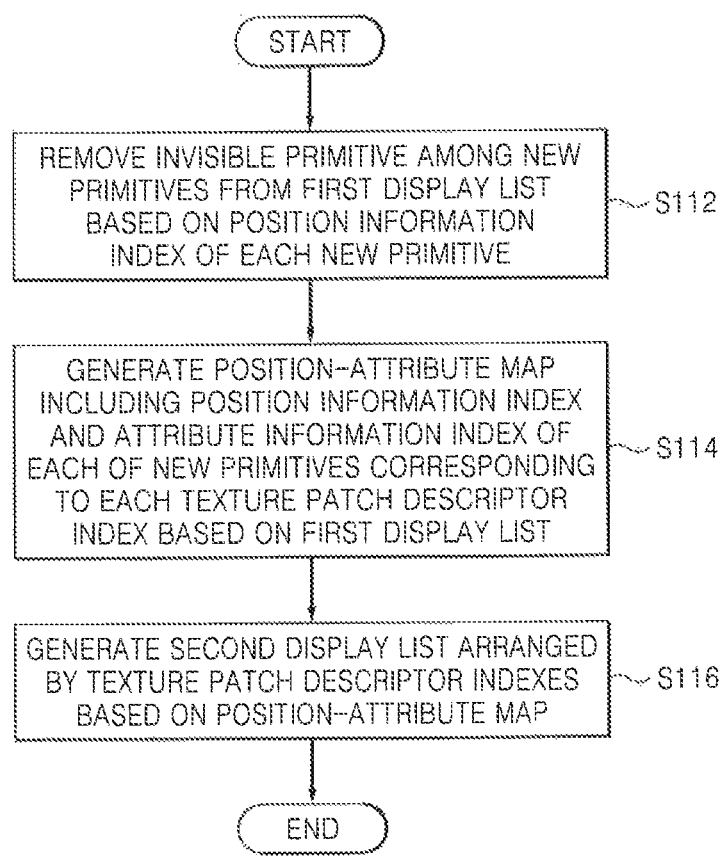
FIG. 15 is a detailed flowchart of the step of generating a second display list in the method of FIG. 14.

FIG. 14 is a flowchart of a method of operating the GPU 100 of FIG. 3 according to an exemplary embodiment of the inventive concept. FIG. 15 is a flowchart of the step S110 of generating the second display list DL2 in the method of FIG. 14.

Referring to FIGS. 1 through 15, the geometry processor 110 receives the input data DATA, generates a plurality of new primitives, and generates position information, attribute information, and a texture patch descriptor for each of the new primitives. The geometry processor 110 generates the first display list DL1 including a position information index, an attribute information index, and a texture patch descriptor index, which respectively indicate positions at which the position information, the attribute information, and the texture patch descriptor are respectively stored in the memory 300, in step S100.

The texture patch processor 140 generates the second display list DL2 by rearranging the first display list DL1 by texture patch descriptor indexes in step S110. The rendering processor 180 generates pixel data by rendering the new primitives based on the second display list DL2 in step S120.

Step S110 may include step S112, S114, and S116 illustrated in FIG. 5. The depth tester 142-1 removes an invisible primitive among the new primitives from the first display list DL1 based on the position information index of each of the new primitives in step S112.

The PAM generator 144-1 generates a position-attribute map including a position information index and an attribute information index of each of new primitives corresponding to each texture patch descriptor based on the first display list DL1 from which the invisible primitive has been removed in step S114. The display list generator 146-1 generates the second display list DL2 arranged by texture patch descriptors based on the position-attribute map in step S116.

The present general inventive concept or portions thereof can alternatively be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, flash memory, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As described above, according to some embodiments of the inventive concept, a GPU performs rendering using a display list arranged by texture patches, thereby increasing data transmission efficiency and power efficiency.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A graphics processing unit, comprising:
   a geometry processor which generates a first display list comprising a position information index, an attribute information index, and a texture patch descriptor index for each of a plurality of new primitives;
   a texture patch processor which generates a second display list by sorting the first display list according to texture patch descriptor indexes; and
   a rendering processor which renders the plurality of new primitives based on the second display list.

2. The graphics processing unit of claim 1, wherein the texture patch processor comprises:
   a position-attribute map generator which generates a position-attribute map comprising the position information index and the attribute information index of each of new primitives corresponding to each texture patch descriptor index based on the first display list; and
   a display list generator which generates the second display list sorted according to the texture patch descriptor indexes based on the position-attribute map.

3. The graphics processing unit of claim 2, wherein the texture patch processor further comprises a depth tester which removes a non-visibly primitive among the plurality of new primitives from the first display list based on the position information index of each of the plurality of new primitives.

4. The graphics processing unit of claim 2, wherein the texture patch processor further comprises a position-attribute map buffer which stores the position-attribute map, and wherein the position-attribute map is generated based on the first display list about some of the plurality of new primitives.

5. The graphics processing unit of claim 2, wherein a position-attribute map buffer storing the position-attribute map is situated outside the texture patch processor, and wherein the position-attribute map is generated based on the first display list about all of the plurality of new primitives.

6. The graphics processing unit of claim 1, wherein the first display list is sorted according to tile indexes of tiles comprising a plurality of pixels.

7. The graphics processing unit of claim 1, wherein the texture patch descriptor index points at textures necessary to render each of new primitives corresponding to the texture patch descriptor index.

8. The graphics processing unit of claim 7, wherein the rendering processor comprises a texture cache which buffers the necessary textures, and wherein the memory capacity for the necessary textures is determined depending on the memory capacity of the texture cache.

9. The graphics processing unit of claim 1, wherein the geometry processor comprises:
   a texture patch descriptor generator which generates a texture patch corresponding to each of the new primitives and a texture patch descriptor corresponding to position information about a position at which texels comprised in the texture patch are stored; and
   a tiler which generates the first display list based on the texture patch descriptor.

10. The graphics processing unit of claim 1, wherein the rendering processor comprises:
    a rasterizer which converts the new primitives into a plurality of pixels based on the second display list; and
    a pixel shader which performs texture mapping on the plurality of pixels.

11. A graphics processing unit, comprising:
    a geometry processor which generates a texture patch descriptor index pointing at textures necessary to render each of a plurality of new primitives;
    a texture patch processor which generates a texture display list arranged according to texture patch descriptor indexes; and
    a rendering processor which renders the plurality of new primitives based on the texture display list.

12. The graphics processing unit of claim 11, wherein the texture patch processor comprises:
    a position-attribute map generator which generates a position-attribute map comprising the position information index and the attribute information index of each of new primitives corresponding to each texture patch descriptor index based on a first display list, wherein the first display list comprises a position information index, an attribute information index, and a texture patch descriptor index for each of the plurality of new primitives; and
    a display list generator which generates the texture display list by sorting the data of the first display list according to the texture patch descriptor indexes based on the position-attribute map.

13. The graphics processing unit of claim 12, wherein the texture patch processor further comprises a depth tester which removes a non-visible primitive among the plurality of new primitives from the first display list based on the position information index of each of the plurality of new primitives.

14. The graphics processing unit of claim 12, wherein the texture patch processor further comprises a position-attribute map buffer which stores the position-attribute map and wherein the position-attribute map is generated based on the first display list about some of the plurality of new primitives.

15. The graphics processing unit of claim 12, wherein a position-attribute map buffer storing the position-attribute map is situated outside the texture patch processor, and the position-attribute map is generated based on the first display list about all of the plurality of new primitives.

16. The graphics processing unit of claim 12, wherein the first display list is sorted according to tile indexes of tiles comprising a plurality of pixels.

17. A graphics processing system, comprising:
- a memory which stores pixel data and vertex data comprising position information and attribute information of each of a plurality of vertices; and
- a graphics processing unit which generates the pixel data by processing the vertex data,
- wherein the graphics processing unit comprises:
- a geometry processor which generates a plurality of new primitives based on the vertex data and to generate a first display list comprising a position information index, an attribute information index, and a texture patch descriptor index for each of the plurality of new primitives;
- a texture patch processor which generates a second display list by sorting the first display list according to texture patch descriptor indexes; and
- a rendering processor which generates the pixel data by rendering the plurality of new primitives based on the second display list.

* * * * *